United States Patent [19]

Sekimoto

[11] Patent Number: 4,983,891

[45] Date of Patent: Jan. 8, 1991

[54] MOTOR DRIVING APPARATUS WITH SPEED DETERMINED CHOPPED DRIVE AND CONSTANT VOLTAGE DRIVE CONTROL

[75] Inventor: Takashi Sekimoto, Tokyo, Japan

[73] Assignee: Konica Corporation, Tokyo, Japan

[21] Appl. No.: 482,204

[22] Filed: Feb. 20, 1990

[30] Foreign Application Priority Data

Mar. 2, 1989 [JP] Japan ................... 1-50861

[51] Int. Cl.⁵ .............................. H02F 7/68
[52] U.S. Cl. ........................ 318/66; 318/696; 328/811; 328/814
[58] Field of Search ............ 318/66, 79, 85, 84, 318/105, 106, 259, 266, 798, 138, 803–812, 254, 434, 819, 52, 696, 59, 109, 110, 685; 382/806, 805, 804, 811, 814, 815, 819, 820, 822, 902, 916

[56] References Cited

U.S. PATENT DOCUMENTS

| 3,575,642 | 4/1971 | Ridding | 318/106 |
| 4,122,919 | 10/1978 | Anzai | 388/847 X |
| 4,295,083 | 10/1981 | Leenhouts | 318/138 X |
| 4,339,704 | 7/1982 | McSparran et al. | 318/140 X |
| 4,524,309 | 7/1985 | Hisatake et al. | 318/434 |
| 4,661,757 | 4/1987 | Hokari et al. | 318/798 |
| 4,879,498 | 11/1989 | Shinohara et al. | 318/106 X |
| 4,904,909 | 2/1990 | Zeeland et al. | 318/266 X |

FOREIGN PATENT DOCUMENTS 1091294 5/1984 U.S.S.R. ................. 318/79

Primary Examiner—William M. Shoop, Jr.
Assistant Examiner—A. Jonathan Wysocki
Attorney, Agent, or Firm—Frishauf, Holtz, Goodman & Woodward

[57] ABSTRACT

A motor driving apparatus for driving a motor with a constant voltage by a driving pulse having a predetermined pulse width when the motor is rotated at a high speed, and for chop-driving the motor by using a chopping clock when the motor is rotated at a low speed.

2 Claims, 3 Drawing Sheets

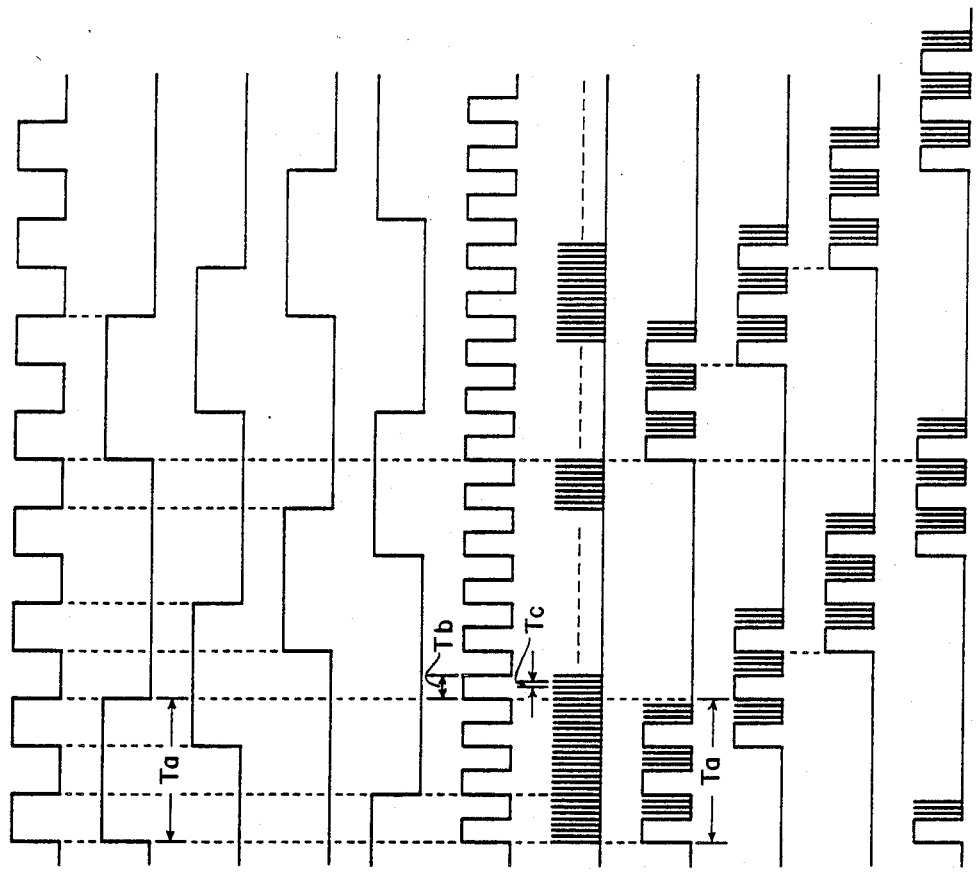
FIG. 2A CONTROL SIGNAL CS
FIG. 2B PHASE OUTPUT A
FIG. 2C PHASE OUTPUT $\overline{A}$
FIG. 2D PHASE OUTPUT B
FIG. 2E PHASE OUTPUT $\overline{B}$
FIG. 2F MULTI-OUTPUT M
FIG. 2G CHOPPING CLOCK CK
FIG. 2H MOTOR DRIVING PULSE DA
FIG. 2I MOTOR DRIVING PULSE $\overline{DA}$
FIG. 2J MOTOR DRIVING PULSE DB
FIG. 2K MOTOR DRIVING PULSE $\overline{DB}$

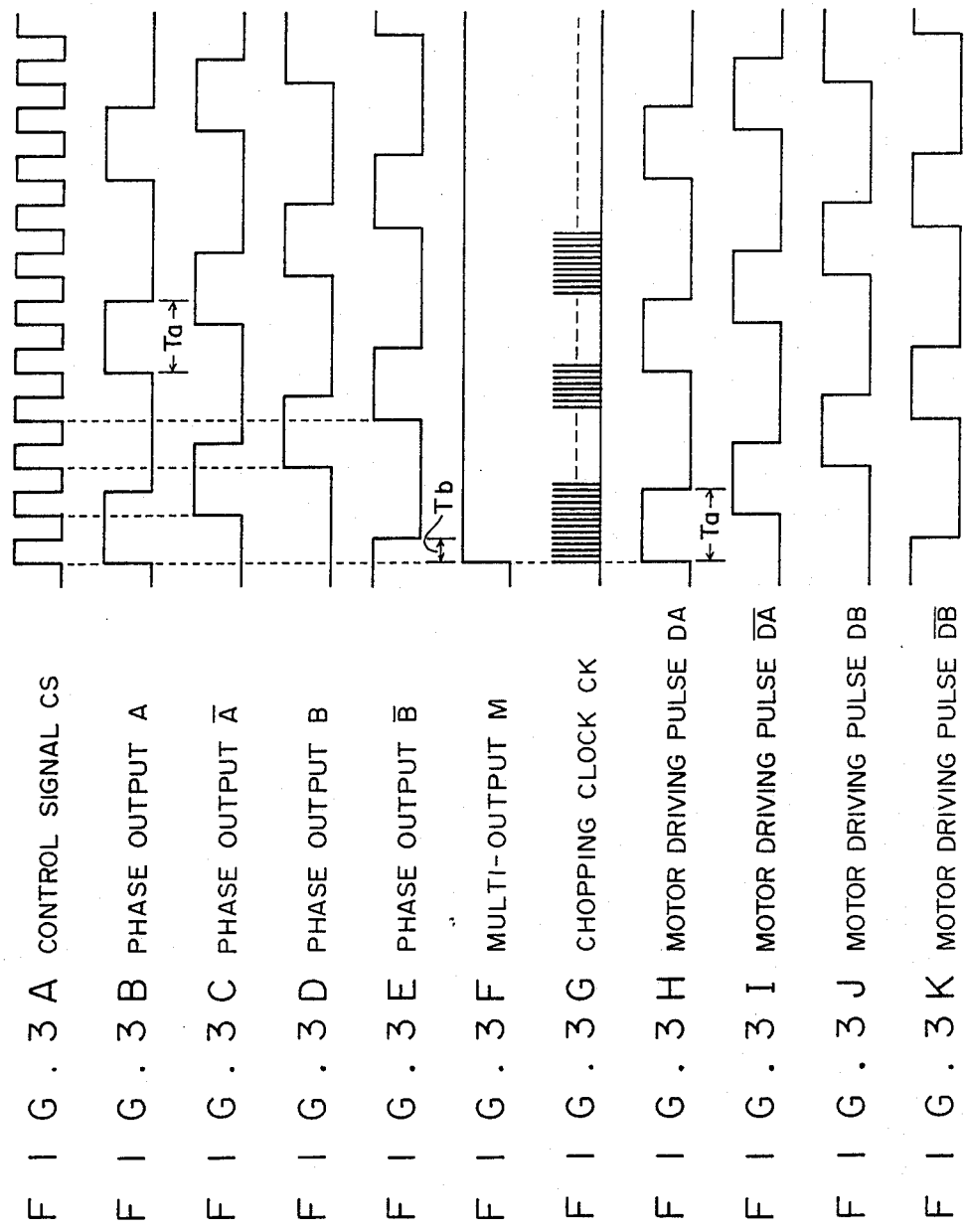

MOTOR DRIVING APPARATUS WITH SPEED DETERMINED CHOPPED DRIVE AND CONSTANT VOLTAGE DRIVE CONTROL

BACKGROUND OF THE INVENTION

1. Field of the Invention

This invention relates to a motor driving apparatus suitably applied to a paper feeder for a facsimile, and more particularly to a power saving motor driving apparatus having an excellent rotational stability.

2. Description of the Prior Art

A facsimile is provided with a paper feeder as a means for transferring documents to be transmitted and a recording paper stored in the interior thereof.

This paper feeder usually employs a stepping motor as a driving motor therefor, and this motor is driven as its speed is controlled in accordance with the content of image data on a document to be transmitted and that of image data on a document to be received.

There are two types of known driving motor driving systems, which are a constant voltage driving system and a constant current chopping driving system.

In the constant voltage driving system, a driving motor is controlled so that a driving voltage applied thereto becomes constant, while, in the latter constant current chopping driving system, a driving motor is driven so that the level of a detected electric current flowing through a motor coil becomes constant, whereby the driving motor is controlled so as to attain a constant motor torque.

In the constant current chopping driving system out of such motor driving systems, the operational stability of a motor during the low speed rotation thereof is ensured but the constant current control accuracy varies depending upon the detecting accuracy of a circuit for detecting the electric current flowing through a motor coil, so that the motor torque varies greatly when the degree of variation of this control accuracy is high.

Since this driving motor driving system is based on a closed circuit control operation, it is necessary as generally known that a DC amplifier and a transfer characteristic-determining filter be provided in the closed circuit for each phase of the motor coil. This causes the circuit structure to be complicated.

In the constant voltage driving system, the operational stability of a driving motor during the high speed rotation is high but a power loss due to the thermal energy occurring during the low speed rotation of the motor becomes large.

SUMMARY OF THE INVENTION

An object of the present invention is to solve these problems in a conventional motor driving apparatus of this kind, and provide a power saving motor driving apparatus capable of securing the stability of rotation of a motor.

To solve the above-mentioned problems, the present invention provides a motor driving apparatus adapted to drive a motor with a constant voltage when the motor is rotated at a high speed, and chop-drive the motor by using a chopping clock when the motor is rotated at a low speed.

The construction of this motor driving apparatus is based on a constant voltage motor driving operation. However, when a driving motor is rotated at a low speed, it is controlled so as to be driven by a chopping clock CK (refer to FIGS. 2A-2K).

This enables the safety of the motor during the low speed rotation thereof to be secured. Since the chopping driving system is employed, the energy loss during the low speed rotation of the motor is small.

When the motor is rotated at a high speed, it is driven at a high voltage by a driving pulse DA-$\overline{DB}$ having a predetermined pulse width (variable), so that the rotation of the motor is stabilized.

Moreover, a circuit used for a constant voltage driving operation has a simple construction.

The above and other objects as well as advantageous features of the invention will become apparent from the following description of the preferred embodiment taken in conjunction with the accompanying drawings.

BRIEF DESCRIPTION OF THE DRAWINGS

FIGS. 2A–2K and 3A–3K are waveforms used to describe the embodiment.

DESCRIPTION OF THE PREFERRED EMBODIMENT

Figure 1:
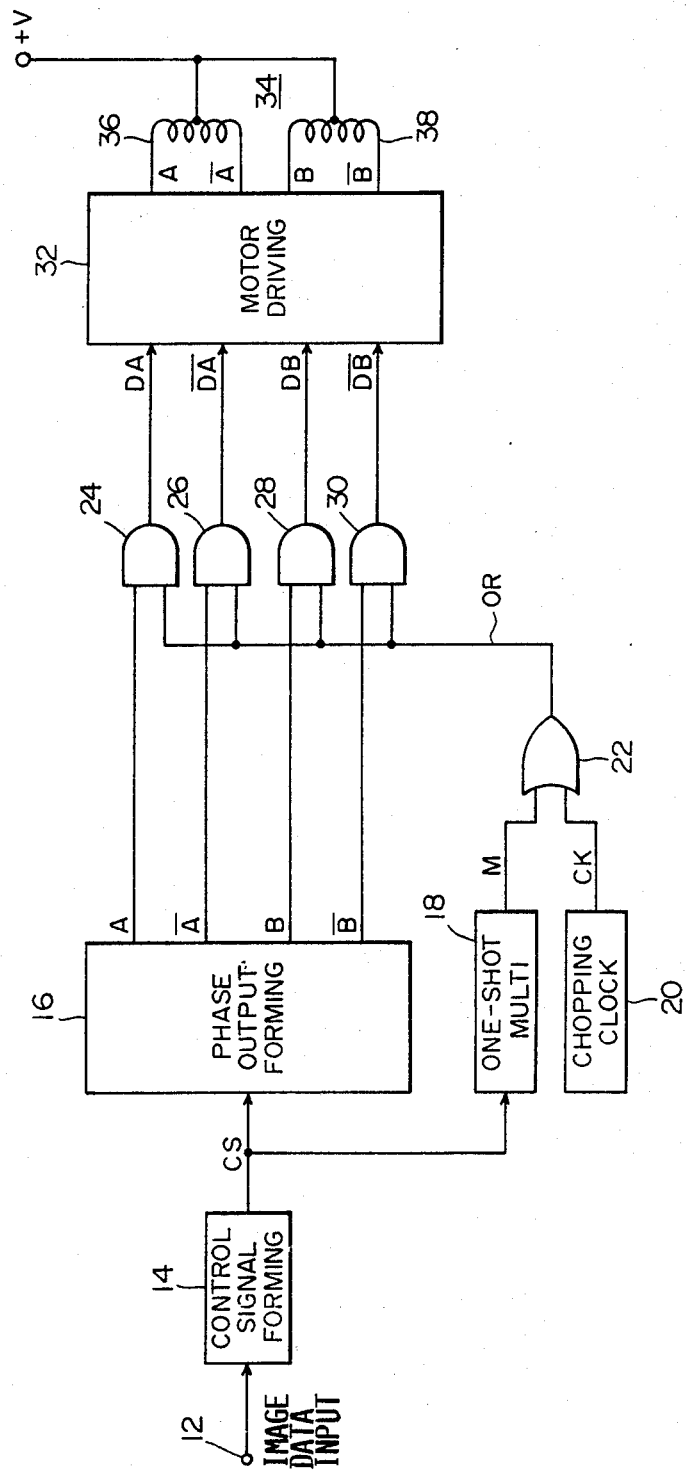
FIG. 1 is a system diagram showing an embodiment of a motor driving apparatus according to the present invention.

An embodiment of a motor driving apparatus according to the present invention applied to a paper feeder for a facsimile will now be described in detail with reference to FIGS. 1–3.

FIG. 1 is a system diagram showing an embodiment of a motor driving apparatus 10 according to the present invention, in which a constant voltage driving system is generally used with a chopping driving system used as necessary.

A motor 34 in use consists as referred to previously of a stepping motor. In this embodiment, a motor of a 1·2-phase excitation system is described as an example. Accordingly, the motor coils consist of an A-phase coil, an $\overline{A}$-phase coil, a B-phase coil and a $\overline{B}$-phase coil. The A— and $\overline{A}$-phase coils are connected to each other and further to a predetermined driving power source +V. Similarly, the B— and $\overline{B}$-phase coils are connected to each other and further to the same driving power source +V.

This motor 34 is used to transfer a document to be transmitted or recording paper. Accordingly, the rotational speed of this motor is controlled in accordance with the content of image data on a document to be transmitted or that of image data on a document to be received.

Namely, when an image data-carrying portion of a document being transmitted is in a predetermined position, the rotational speed of the motor is controlled to a low level, so that the feed speed of the document is controlled to a low level. When an image data-carrying portion of recording paper is in a predetermined position, the feed speed of the paper is also controlled to a low level.

On the other hand, when a ground portion, i.e. a portion on which the image data to be transmitted are absent, of a document being transmitted is in a predetermined position, the feed speed of the document is increased. The same applies to recording paper.

Thus, the rotational speed of the motor 34 is controlled in accordance with the contents of the image data to be transmitted and received.

Accordingly, a speed control signal relative to image data is supplied to a terminal 12, and it is converted into a control signal CS (FIG. 2A), which has a pulse width Ta corresponding to the speed control signal, in a control signal forming circuit 14.

The control signal CS is supplied to a phase output forming circuit 16 to form four-phase outputs A-$\bar{B}$ (FIGS. 2B–2E) in agreement with the 1·2-phase excitation. All of these phase outputs A-$\bar{B}$ are the same as the driving pulse used when the constant voltage driving system is employed.

The control signal CS is also supplied to a retriggerable one-shot multivibrator 18 to form a multi-output M (FIG. 2F) having a pulse width Tb. This multi-output M is used during a chopping driving operation. In relation to the multivibrator 18, a chopping clock generating circuit 20 is provided, from which a chopping clock CK (FIG. 2G) of a predetermined frequency is outputted.

The frequency of the chopping clock CK is selectively set sufficiently higher than the highest frequency of the multi-output M, and it is selectively set to a level (for example, 24 KHz) out of an audio frequency band in this embodiment.

The multi-output M and chopping clock CK are logically summed in an OR-circuit 22, and an output therefrom and phase outputs A-$\bar{B}$ are supplied to AND-circuits 24, 26, 28, 30 to be logically multiplied. Outputs of the resultant logical products are used as motor driving pulses DA-$\overline{DB}$ (FIG. 2H–2K).

The motor driving pulses DA-$\overline{DB}$ are supplied to a motor driving circuit 32, and the application of an electric current to the corresponding motor coils (phase windings) is thereby controlled. Namely, the application of an electric current to the A-to $\bar{B}$-phase motor coils is controlled sequentially in this order, so that these motor coils are excited.

Thus, the present invention employs a constant voltage driving system as a basic motor driving system, and a chopping driving system as necessary. Therefore, a current detecting circuit, which is said to be required in the constant current chopping driving system, as well as an amplifier and a filter, which are required in a closed circuit structure, become unnecessary. Consequently, the circuit structure in the present invention is simplified as compared with that used when the constant current chopping driving system is employed.

The relation between the pulse width Ta of the phase outputs A-$\bar{B}$ and the pulse width Tb of the multi-outputs M is selectively set to:

$$Ta_{min} \lesssim 3Tb \qquad (1)$$

wherein Tamin represents the pulse width of the phase outputs A-$\bar{B}$ generated when the motor 34 is controlled to the highest speed.

When the motor 34 is rotated at a low speed with this relation set selectively in this manner, the pulse width Ta of the phase outputs A-$\bar{B}$ becomes not less than three times as large as that Tb of the multi-output M in the examples, so that the outputs OR of the logic sum from the OR-circuit 22 become as shown in FIGS. 2H–2K. Namely, during the part of a period of the pulse width Ta which is after the completion of the outputting of the multi-output M, the chopping clock CK is outputted, on the basis of which the motor 34 is driven.

Accordingly, when the motor is rotated at a low speed, it is chopping-driven. However, in this case, the motor is not driven by the constant current driving system.

When the motor is rotated at a high speed, the frequency of the control signal CS becomes high, and the pulse width thereof narrow. Therefore, when the rotational speed of the motor 34 increases to a certain extent, around three times that of the motor rotated slowly in this embodiment, the pulse width Ta of the phase outputs A-$\bar{B}$ becomes not less than three times as large as that Tb of the multi-output M.

Consequently, the time (corresponding to the pulse width of the control signal CS) between the rising of a pulse of the control signal CS and the falling thereof becomes shorter than the time represented by a time constant of the multivibrator 18.

As a result, the control signal CS constituting a subsequent trigger is inputted before the inversion of an output from the multivibrator 18. Accordingly, the multi-output M obtained at this time consists of continuous signals (FIG. 3F).

Consequently, the multi-output M, not the chopping clock CK (FIG. 3G) is outputted from the OR-circuit 22, so that the motor driving pulses DA-$\overline{DB}$ become identical with the phase outputs A-$\bar{B}$ (FIGS. 3B–3E and 3H–3K).

When the motor is rotated at a high speed, the phase outputs A-$\bar{B}$ are supplied as motor driving pulses DA-$\overline{DB}$ to the motor driving circuit 32. Therefore, the motor 34 in such a case is driven with a constant voltage.

Thus, when the motor is rotated at a low speed, the chopping clock CK is supplied as a motor driving pulse, while, when the motor is rotated at a high speed, the phase outputs A-$\bar{B}$ are supplied as such. Accordingly, when the motor is rotated at a low speed, it is controlled by the chopping driving system, and a predetermined level of motor torque can be obtained. Since the constant voltage driving system is not used in this case, an energy loss does not occur.

On the other hand, when the motor is rotated at a high speed, the driving system is switched to the constant voltage driving system, and the stability of high speed rotation of the motor can be secured.

The reasons why the relation between the pulse widths Ta, Tb is determined selectively as shown in the equation (1) reside in the purpose of maintaining the multi-output M at a continuous, constant level during the high speed rotation of the motor, and obtaining an output of a constant level as the output OR of logic sum. This purpose requires to be met for the following reason. If the falling of a pulse occurs even once during the period Ta, the chopping clock CK is outputted while the pulse falls, so that it becomes impossible to carry out the constant voltage driving operation.

In the above-described embodiment, the present invention is applied to the motor provided in a paper feeder for a facsimile but it is only an example of the present invention. The present invention can be applied to any motor control system as long as the control system is used for a motor the rotational speed of which requires to be controlled as mentioned above.

According to the present invention described above, the constant voltage driving system is generally used with the chopping driving system used as necessary. The present invention is adapted to drive a motor by the chopping driving system when the motor is rotated at a low speed, and by the constant voltage driving system when the motor is rotated at a high speed.

The present invention has characteristics that a motor driving operation making use of the advantageous features only of the chopping driving system and constant voltage driving system can be carried out. This enables the stability of rotation of a motor to be obtained, and the saving of energy to be attained advantageously.

What is claimed is:

1. A motor driving apparatus for a stepper motor for use in a facsimile machine, comprising:

means for generating a control signal to control the stepper motor at a speed corresponding to image data to be transmitted or reproduced, said control signal having a pulse width which decreases with increasing motor speeds;

means for coverting said control signal to phase signals wherein each of said phase signals is delayed a predetermined period relative to a preceding phase signal;

pulse generating means including chopping clock means for producing a chopping clock signal, for generating pulse signals in response to said control signal, and wherein said pulse generating means further includes means for generating said chopping clock signal to control said motor for low speed operation, and for generating a continuous signal to control said motor for high speed operation; and means for generating motor driving signals wherein a chopping drive signal is produced to drive said motor during said low speed operation in accordance with said phase signals and with said chopping clock signal from said pulse generating means, and a continuous drive signal is produced to drive said motor during said high speed operation in accordance with said phase signals and with said continuous signal from said pulse generating means.

2. A motor driving apparatus according to claim 1, wherein said pulse generating means further includes:

multivibrator means for producing an output signal of a determined pulse width in response to each control signal pulse; and OR gate means having a first input coupled to the output of said multivibrator means and a second input coupled to the output of said chopping clock means, so that when the pulse width of each control signal pulse is greater than the predetermined output pulse width of said multivibrator means corresponding to a low speed range of said motor, said chopping clock signal is output from said OR gate means after the output signal of said multivibrator means to control said motor, and, when the pulse width of each control signal pulse is smaller than the predetermined output pulse width of said multivibrator means corresponding to a high speed range of said motor, only said continuous signal is output from said OR gate means to control said motor.

* * * * *